May 23, 1967
J. R. MEININGER
3,320,937
CHARGE FORMING AND FUEL FEEDING METHOD AND
APPARATUS FOR INTERNAL COMBUSTION ENGINES
Original Filed Feb. 14, 1963
2 Sheets-Sheet 1
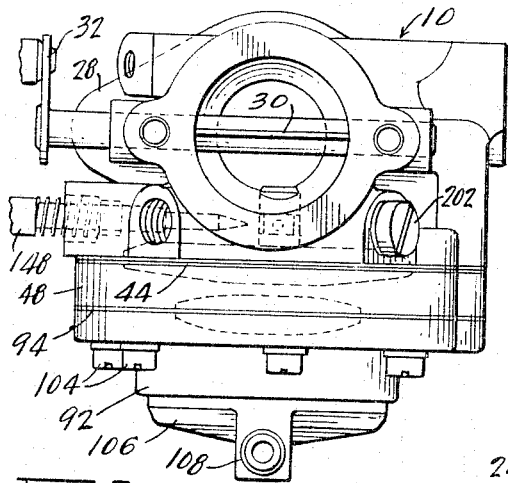
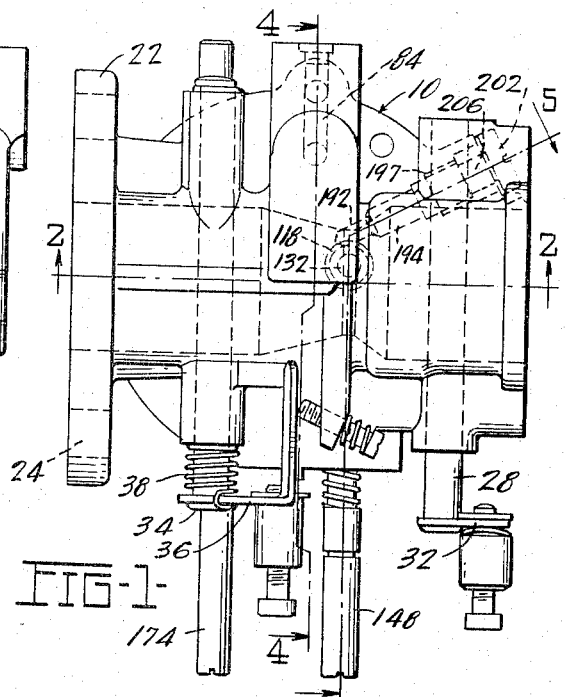
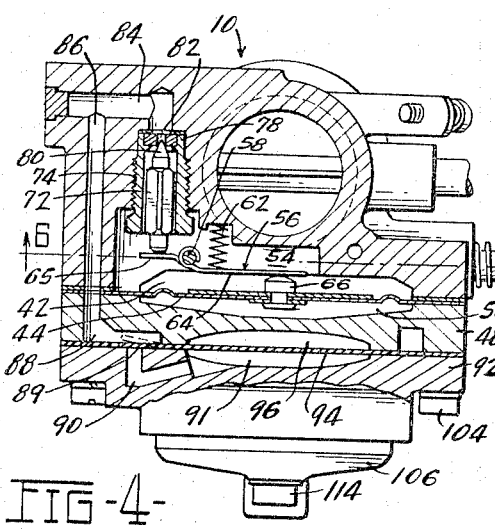
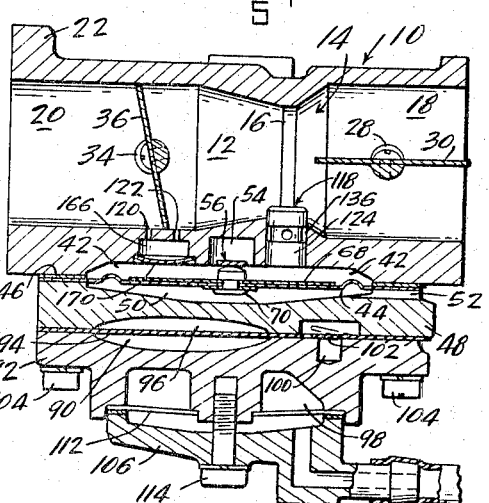
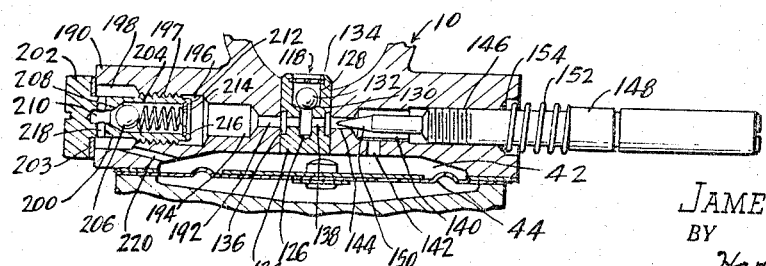
INVENTOR:
JAMES R. MEININGER.
BY
Harry O. Ernsberger
ATTORNEY May 23, 1967 J. R. MEININGER 3,320,937
CHARGE FORMING AND FUEL FEEDING METHOD AND
APPARATUS FOR INTERNAL COMBUSTION ENGINES
Original Filed Feb. 14, 1963 2 Sheets-Sheet 2
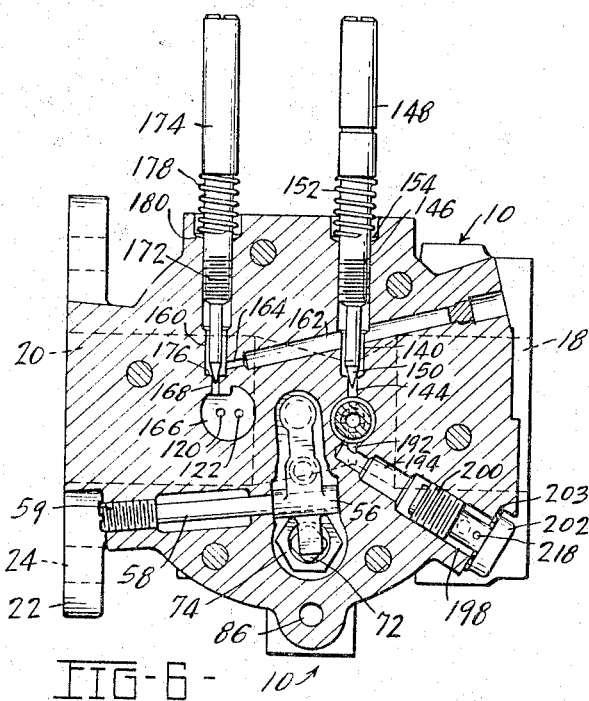
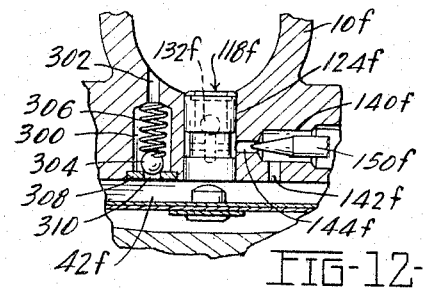
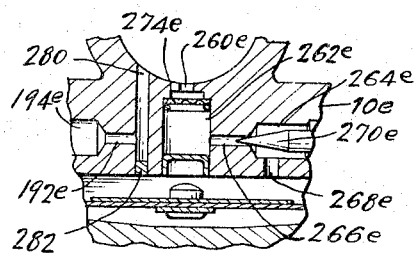
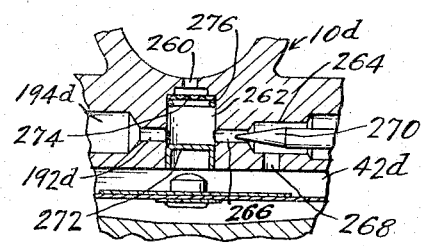
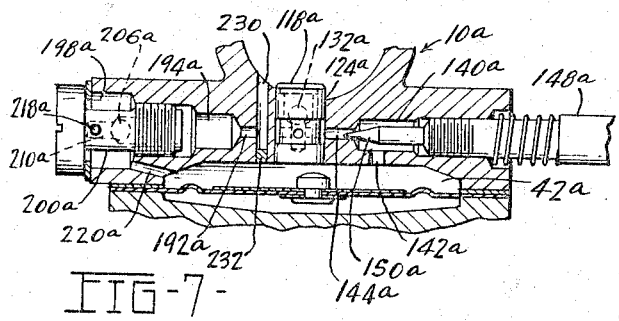
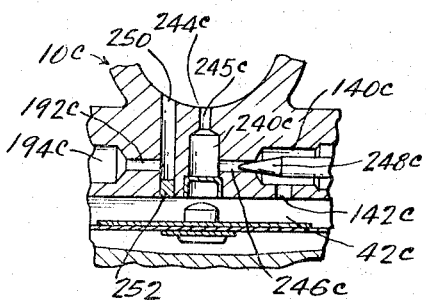
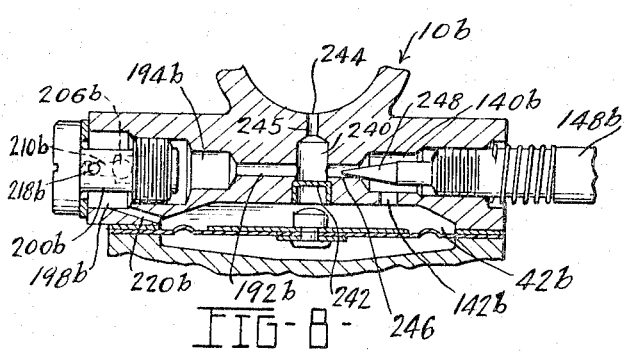
INVENTOR:
JAMES R. MEININGER.
BY
Harry O. Ernsberger
ATTORNEY United States Patent Office 3,320,937
Patented May 23, 1967

3,320,937
CHARGE FORMING AND FUEL FEEDING METHOD AND APPARATUS FOR INTERNAL COMBUSTION ENGINES
James R. Meininger, Fond du Lac, Wis., assignor to The Tillotson Manufacturing Company, Toledo, Ohio, a corporation of Ohio
Original application Feb. 14, 1963, Ser. No. 258,511. Divided and this application June 1, 1966, Ser. No. 554,488
1 Claim. (Cl. 123—97)

This is a division of my copending application Ser. No. 258,511, filed Feb. 14, 1963, now Patent No. 3,278,172, granted Oct. 11, 1966.

This invention relates to charge forming apparatus and more especially to a method of and apparatus for supplying a proper fuel and air mixture to an internal combustion engine under normal operating conditions and, under other operating conditions to deliver an excess amount of fuel into the mixture whereby the enriched mixture has insufficient air for proper combustion resulting in a slow burning mixture inadequate to provide power to maintain normal engine operation whereby increased speed of the engine is automatically prevented.

Internal combustion engines, and particularly those of the two cycle type are being used extensively for powering chain saws and in other applications where the engine is periodically subjected to high load and the loads suddenly reduced or eliminated before an operator is enabled to reduce the engine speed by conventional throttle manipulation.

For example, in the use of a chain saw, which is subject to intermittent operation under load conditions as when felling a tree or cutting up logs, the saw is operated under open throttle at approximately six thousand or more revolutions per minute. When an operator completes a saw cut and the load on the engine suddenly eliminated, the engine rapidly increases in speed until reduced by closing the throttle of the charge forming apparatus. Excessive high speed of a chain saw poses potential hazards in that the engine may be damaged because of lack of lubrication and, furthermore, the engine may reach a speed at which centrifugal forces of the moving saw chain may result in fracturing the saw chain, endangering the operator.

Conventional chain saws are usually equipped with centrifugal clutch mechanism between the engine crankshaft and the drive sprocket for the saw chain which is arranged to transmit power driving the saw chain until the engine speed and saw chain driving sprocket are reduced to approximately idling speed, the centrifugal clutch being then operative to disconnect the drive between the engine crankshaft and the driving sprocket for the saw chain. Heretofore there has been no satisfactory means or governor arrangement to prevent run-away operation or excessive engine speed when a sawing operation is completed.

The present invention embraces the provision of a method of automatically enrichening the fuel and air mixture in the charge forming apparatus to an extent that the proportion of air to the increased amount of fuel is insufficient providing a slow burning, low power mixture for the engine whereby to automatically prevent the operation of the engine at excessive speeds when the load on the engine is suddenly reduced or eliminated.

An object of the invention is the provision of automatically operable means effective at a predetermined engine speed for delivering an excess amount of liquid fuel into a mixing passage of a charge forming apparatus to temporarily enrichen the mixture to an extent that incomplete combustion ensues in the engine, reducing the power and thereby automatically governing the engine against excessive speeds.

Another object of the invention is the provision of a valve means in the fuel system of a charge forming apparatus arranged to open a fuel by-pass when the pressure in the mixing passage is reduced below a predetermined value to effect temporary delivery of additional fuel into the mixing passage to impair the fuel to air ratio to an extent that the engine with which the charge forming apparatus is used will not develop power and thereby reduce the engine speed until the pressure in the mixing passage increases to effect a closing of the valve in the fuel by-pass and reestablish a proper fuel and air mixture for nomal operation of the engine.

Another object of the invention resides in a diaphragm-type carburetor wherein a diaphragm actuated by aspiration in the mixing passage regulates or meters fuel flow from a supply into a fuel chamber in the charge forming apparatus in combination with a fuel by-pass system embodying a valve controlled by the degree of aspiration or reduced pressure in the mixing passage to effect the automatic delivery of an excess amount of fuel into the mixing passage and thereby prevent the operation of the engine at excessive speed.

Another object of the invention is the provision of a carburetor of the diaphragm-type embodying a fuel and air mixing passage and a diaphragm arranged to meter fuel flow into a chamber in the carburetor responsive to aspiration in the mixing passage transmitted to the fuel chamber through a main orifice system or a secondary orifice system, the primary orifice system including a main fuel delivery orifice and fuel channel arrangement to prevent back bleeding of air through the main orifice when the secondary orifice system is delivering fuel into the mixing passage, the carburetor embodying a fuel by-pass arrangement for effecting the delivery of an excess amount of fuel into the mixing passage, the by-pass embodying a valve means responsive to aspiration in the mixing passage for initiating fuel flow through the by-pass into the mixing passage for controlling engine speed through over-enrichenment of the fuel and air mixture delivered to the engine.

Another object of the invention resides in the provision of a diaphragm-type carburetor wherein the diaphragm controlling fuel flow into a fuel chamber in the carburetor is actuated solely by aspiration in the mixing passage in combination with aspiration actuated means for over-enrichening the fuel and air mixture when the aspiration in the mixing passage falls below a predetermined pressure.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a top plan view of a diaphragm-type carburetor embodying the invention;

FIGURE 2 is a longitudinal sectional view taken substantially on the line 2—2 of FIGURE 1;

FIGURE 3 is an end view of the carburetor shown in FIGURE 1;

FIGURE 4 is a transverse sectional view taken substantially on the line 4—4 of FIGURE 1;

FIGURE 5 is a detail sectional view taken substantially on the line 5—5 of FIGURE 1;

FIGURE 6 is a sectional view taken substantially on the line 6—6 of FIGURE 4;

FIGURE 7 is a detail sectional view similar to FIG-

URE 5 illustrating a modified form of fuel delivery by-pass arrangement of the invention;

FIGURE 8 is a detail sectional view similar to FIGURE 7 illustrating a fuel by-pass in combination with an arrangement for establishing a capillary seal in the primary fuel delivery system to prevent back bleeding of air into the fuel channels under certain operating conditions;

FIGURE 9 is a detail sectional view illustrating another form of fuel by-pass for the mixing passage in combination with arrangement in the primary fuel delivery system for establishing a capillary seal under certain operating conditions;

FIGURE 10 is a fragmentary detail sectional view illustrating a fuel by-pass in combination with another form of means in a main orifice construction for preventing back bleeding of air under certain conditions;

FIGURE 11 is a detail sectional view similar to FIGURE 10 illustrating a modified form of fuel by-pass for the mixing passage with the main orifice construction of the character illustrated in FIGURE 10, and FIGURE 12 is a fragmentary sectional view illustrating another form of fuel by-pass and valve arrangement.

While the method of establishing delivery of excess fuel into a mixing passage of a charge forming apparatus and the arrangement for carrying out the method of the invention are particularly usable in apparatus for delivering fuel and air mixture to an engine operating a chain saw, it is to be understood that the method and apparatus of the invention may be employed for effecting or controlling delivery of fuel and air mixture to various types of engines for various purposes wherever it is desired to control or prevent excessive engine speed under reduced or no load conditions.

Referring to the drawings in detail a charge forming apparatus or carburetor of the diaphragm type embodying the invention is illustrated in FIGURES 1 through 6. The carburetor is inclusive of a body member 10 formed with an air and fuel mixing passage 12 having a Venturi 14, the choke band or restricted region thereof being indicated at 16. The mixing passage has an air inlet region 18 and a mixture outlet region 20. The outlet end of the carburetor body is formed with a mounting flange 22 having openings 24 to accommodate bolts or other securing means for securing the mounting flange 22 to the crankcase of a two cycle engine or to a manifold of a four cycle engine whereby the fuel mixture is delivered through the outlet 20 to the engine.

Journaled in bores provided in the body wall at the air inlet region 18 is a shaft 28 supporting a disc-like choke valve 30, a portion of the shaft exteriorly of the carburetor body being provided with a manipulating arm 32 shown in FIGURES 1 and 3.

Extending across the mixture outlet region 20 and journaled in bores formed in the wall of the body 10 is a shaft 34 supporting a disc-like throttle valve 36 for controlling flow of fuel and air mixture into the crankcase of the engine with which the carburetor may be used.

As shown in FIGURE 1, a portion of the shaft 34 extending exteriorly of the carburetor body is equipped with a manipulating arm 36 for controlling the position of the throttle valve 36, a coil spring 38 engaging the arm 36 and the carburetor body for normally biasing or urging the throttle valve 36 toward engine idling or near closed position as shown in FIGURE 2.

The carburetor body 10 is formed with a generally circular recess providing a fuel chamber 42, and a flexible membrane or diaphragm 44 extends across the recess forming a flexible wall of the chamber 42 as particularly shown in FIGURES 2, 4 and 5, the chamber being unvented. An annular gasket 46 is disposed between a surface of the carburetor body and the peripheral region of the diaphragm 44. A substantially circular disc-like member 48 is disposed beneath the diaphragm and is formed with a central circular recess 50 providing a space to accommodate flexing movements of the diahpragm or membrane 44.

The peripheral region of member 48 is engaged with the diaphragm 44 and secures the diaphragm in assembled relation with the carburetor body, the member 48 also forming a component of a fuel pump construction hereinafter described.

The member 48 is provided with a vent passage 52 open to the atmoshpere to maintain atmospheric pressure beneath the diaphragm 44 at the dry side thereof. The diaphragm 44 is fashioned of highly flexible material and may be formed as an impervious resin film or it may be made of a fine mesh fabric coated with a suitable resin or material to render the diaphragm impervious.

The body 10 is formed interiorly with an elongated recess 54 forming part of the fuel chamber 42, the recess 54 accommodating a lever 56 pivoted or fulcrumed intermediate its ends on a pin or shaft 58 mounted in an opening formed in the body. The end region of the pin or shaft 58 has a threaded portion 59 threaded into an entrance region of the opening accommodating the pin 58 to facilitate assembly of the lever 56 with the fulcrum pin.

Mounted in a recess formed in the body 10 and disposed between the bottom of the recess and the lever 56 is an expansive coil spring 62 which engages the long arm 64 of the lever 56. The distal end of the lever arm 64 is adapted to be engaged with the head of a rivet or member 66 secured to the diaphragm 44 there being reinforcing metallic washers or discs 68 and 70 at the respective sides of the diaphragm as particularly shown in FIGURES 2, 4 and 5. The short arm 65 of the lever 56 engages an end of a fuel inlet valve body or member 72, shown in FIGURE 4.

The body 10 is formed with an interiorly threaded bore which accommodates a threaded fitting or valve cage 74, the valve body 72 being slidable within an interior bore formed in the valve cage 74. The valve member or body 72 is of polygonal cross-section to facilitate fuel flow past the facets provided by this configuration. Arranged adjacent the upper end of the valve cage 74 is an annularly-shaped valve seat 78 preferably of nonmetallic material. The valve body or member 72 is fashioned at its upper end with a cone or needle shaped valve portion 80 which cooperates with the port 82 in the valve seat 78.

The port 82 is in communication with a fuel inlet 84. As hereinafter explained, the diaphragm 44 is influenced by aspiration in the mixing passage 12 to control the position of the fuel inlet valve 74 through the medium of the motion transmitting lever 56. The fuel inlet passage or channel arrangement 84 is in communication with a fuel channel or duct 86 in registration with a duct 88.

Fuel flow through a port 90 to the duct 88 is controlled by a flap valve 89, the port 90 opening into a fuel compartment or chamber 91 formed in a member 92 positioned beneath the member 48. Disposed between the adjacent regions of members 48 and 92 provided with a cavity is a flexible pumping diaphragm 94 forming a pumping chamber 96, the latter being in communication with the crankcase of the engine through duct means (not shown) extending through the mounting flange 22 of the carburetor. The fuel pump illustrated herein is of the character disclosed in U.S. Patent 2,796,838, granted June 25, 1957.

The fuel compartment 91 of the pump is in communication with a chamber 98 formed in member 92 through a channel 100, the diaphragm being provided with a second flap valve 102 controlling fuel flow through the channel 100. The member 92, member 48, the pumping diaphragm 94 and the fuel metering diaphragm 44 are held in assembled relation by a plurality of screws 104 extending through registering openings formed in the above-mentioned members and diaphragms and threaded into suitable threaded bores formed in the body 10 of the carburetor providing a combined pump and carburetor combination.

As the pumping chamber 96 above the pumping diaphragm 94 is connected with the crankcase of a two cycle engine, varying fluid pressure in the crankcase cause vibration or pumping action of the pumping diaphragm 94 to effect fuel flow from the chamber 98 through the fuel compartment or chamber 91 of the fuel pump to the region of the fuel inlet valve 80.

The fuel compartment or chamber 98 in member 92 is provided with a cover member 106 formed with an integral nipple portion 108 connected by a tube 110 with a fuel supply tank or reservoir (not shown). The screen 112 between the cover member 106 and the fuel receiving compartment 98 filters out any foreign matter in the fuel. The cover member 106 and the screen 112 are held in place by a bolt 114.

The carburetor is fashioned with orifice means for delivering fuel into the mixing passage for high speed, low speed and engine idling operations and fuel channel means for conveying fuel from the chamber 42 to the orifice means.

The fuel delivery means is inclusive of a primary fuel delivery system which includes a main fuel delivery orifice 118 opening into the restricted region or choke band 16 of the Venturi 14. The secondary orifice system includes an engine idling orifice 120 and a low speed orifice 122, shown in FIGURES 2 and 6.

The arrangement providing the main orifice 118 is of unit construction and is inclusive of a cylindrically shaped fitting or member 124 which is pressed or snugly fitted into a bore formed in the body 10 and disposed in the position shown in FIGURES 2 and 5. The fitting 124 is provided with a central bore 126 extending partially through the fitting. The fitting is formed with a counterbore 128, the connecting ledge between the bore 126 and the counterbore 128 forming a valve seat 130 for a ball check valve 132.

The purpose of the ball check valve 132 is to prevent back bleeding of air from the mixing passage into the secondary fuel channels when the secondary orifice system is delivering fuel into the mixing passage. The open end of the counterbore 128 in the member 124 forms the main fuel delivery orifice 118, an annular member 134, formed with a diametrically arranged bar, is positioned in the upper end of the counterbore 128 to prevent dislodgment of the ball valve 132. The ball valve 132 is of lesser diameter than the counterbore 128 to facilitate delivery of fuel past the valve through the main orifice 118 into the mixing passage.

The fitting 124 is fashioned with a circumferential recess 136 which is in communication with the central bore 126 by transverse passages 138. The carburetor body 10 is provided with a bore 140 which is in communication with the fuel chamber 42 by a fuel duct 142 and with the circumferential recess 136 in the fittings 124 by a restricted passage 144, as shown in FIGURE 5. A region of the bore 140 is threaded to accommodate a threaded portion 146 of a manually adjustable valve body 148.

The valve body 148 is fashioned with a needle shaped valve portion 150 which extends into and cooperates with a restriction 144 for metering or regulating fuel flow to the main fuel delivery orifice 118. An expansive coil spring 152 is disposed between a ledge formed on the valve body 148 and an annular sealing gasket 154 surrounding the valve body to prevent leakage of fuel along the valve body. The spring 152 establishes sufficient friction to hold the valve body 148 in adjusted position.

The primary or main fuel delivery system includes the fuel channel 142, the bore 140, the restricted passage 144 and the passages in the fitting 124 conveying fuel from the fuel chamber 42 to the main orifice 118. The secondary fuel channel system is illustrated in FIGURE 6. The carburetor body 10 is fashioned with a bore 160 in communication with the bore 140 by a channel or passage 162 and a restricted duct or passage 164.

The bore 160 is in communication with a supplemental or auxiliary chamber 166 by a restricted passage 168. The secondary orifices 120 and 122, particularly shown in FIGURE 2, are supplied with fuel from the auxiliary chamber 166, the lower end of the chamber being closed by a Welch plug 170.

A portion of bore 160 is threaded to receive the threaded portion 172 of a second manually adjustable valve body 174. The valve body 174 is fashioned with a needle valve portion 176 extending into and cooperating with the restricted passage 168. The adjustable needle valve 176 serves to meter or regulate fuel flow to the secondary orifices viz. the engine idling orifice 120 and the low speed orifice 122. An expensive coil spring 178 is disposed between a ledge formed on the valve body 174 and an annular sealing gasket 180 surrounding the valve body, this arrangement preventing leakage of fuel along the valve body. The spring 178 sets up friction to retain the valve body 174 in adjusted position.

The operation of the carburetor or charge forming apparatus so-far described is as follows: During engine operation, the aspiration or reduced pressure in the mixing passage 12 is transmitted through the fuel channels to the fuel chamber 42, setting up reduced pressure in the fuel chamber which causes upward flexure or movement of the diaphragm 44. The movement of the diaphragm is transmitted by the lever 56 to the fuel inlet valve 72 whereby the valve member 72 is moved downwardly to admit fuel through the port 82 past the cone-shaped valve portion 80 into the fuel chamber.

At intermediate and high engine speeds, the fuel is delivered by aspiration through the main orifice 118 from the unvented fuel chamber 42 through the passages or channels 142, 140, 144, the annular recess 136, transverse passages 138 in the fitting 124, thence through the bore 126 and counterbore 128 into the mixing passage. The fuel flow to the main orifice 118 is metered or regulated by manually adjusting the position of the needle valve 150.

When the throttle is in idling or partially open position and fuel is delivered from the orifice 120 or the low speed orifice 122, fuel is conveyed to these orifices through fuel passage 142, bore 140, transverse passage 162, restriction 164, past the needle valve 176 through restriction 168 into the auxiliary or supplemental chamber 166 for delivery through the secondary orifices. The valve means in the form of the ball check valve 132, shown in FIGURE 5, during delivery of fuel through the secondary orifice system is engaged with its seat 130 and prevents back bleeding of air through the main orifice 118 and into the fuel channels as leaning of the fuel would cause the engine to stall.

Fuel is supplied to the fuel inlet during operation of the engine by the fuel pump as the pumping diaphragm 94 is vibrated by varying pressure in the engine crankcase. Fuel flow into the fuel chamber 42 is metered by the diaphragm 44 responsive to aspiration in the mixing passage to regulate or control the position of the inlet valve body 72.

As the delivery of fuel into the mixing passage is dependent solely upon the influence of aspiration upon the diaphragm 44, the carburetor is enabled to operate in all angular positions of tilt or in inverted position.

The carburetor of the invention embodies a valve controlled fuel by-pass arrangement for performing the method of the invention of delivering an excess amount of liquid fuel into the mixing passage under certain engine operating conditions to prevent excessive engine speed under no load conditions or to reduce or control engine speed by over-enriching the mixture so that it burns slowly or produces incomplete combustion thereby reducing the power and hence the speed of the engine.

This is accomplished automatically through the use of a resiliently biased valve associated with a fuel by-pass system wherein the valve is adapted to be opened by comparatively high aspiration in the mixing passage to supplement fuel flow through the main orifice 118 by additional fuel delivered into the mixing passage to over-enrich the fuel and air mixture. One form of arrangement of the fuel by-pass system is illustrated in FIGURES 5 and 6.

The carburetor body 10 is fashioned with a boss 190 in which is formed a passage 192 in communication with the annular recess 136 in the fitting 124, a bore 194 of slightly larger diameter than the passage 192, a second bore 196 of slightly larger diameter than bore 194, the bore 196 having a threaded portion 197 and a third counterbore 198, as shown in FIGURE 5.

Disposed in the bores 197 and 198 is a member or fitting 200 having a threaded portion threaded into portion 197 of bore 196. The fitting 200 has an enlarged head 202, and a gasket 203 is disposed between the head 202 and the end surface of the boss 190 to close the open end of the bore 198 in the carburetor body.

The fitting 200 has an interior bore 204 in which is disposed valve means such as a ball valve 206 which seats against a ledge 208 formed between bore 204 and a comparatively short passage 210. The valve 206 is biased toward closed position by means of an expansive coil spring 212, the spring being held in the fitting 202 by means of an annular washer 214 by staking or swaging a portion 216 at the extremity of the fitting 200 as an abutment for the washer 214.

The shank portion of the fitting 200 is provided with transverse passages 218 establishing communication between the bore 198 and the passage 210 in the fitting adjacent the valve 206. The bore 198 is in communication with the fuel chamber 42 by means of a duct or passage 220. It will be apparent from FIGURE 5 that when the ball valve 206 is moved away from its seat 208, a fuel by-pass to the main orifice is established through the passage 220, counterbore 198, transverse passages 218, passage 210, interior bore 204 in the fitting, counterbore 194 and passage 192, the latter being in communication with a peripheral recess 136 in the fitting 124.

As an engine increases in speed, the aspiration or reduced pressure in the mixing passage of the carburetor is proportionately increased. The spring 212 is calibrated or proportioned to maintain the valve 206 in closed position until the aspiration or reduced pressure in the mixing passage reaches a predetermined value established when the engine attains a predetermined speed. When the predetermined engine speed is exceeded, the increased aspiration is effective to open the valve 206 whereby additional fuel is delivered through the main orifice 118 through the fuel by-pass system above described. The carburetor operates in a normal manner until the predetermined speed has been exceeded.

For example, in the operation of a chain saw engine equipped with the carburetor of the invention, the normal sawing speed may be five thousand to approximately six thousand revolutions per minute. The spring 212 is calibrated so that when the chain saw engine speed exceeds approximately six thousand revolutions per minute or normal sawing speed under load conditions, the valve 206 is opened by the increased aspiration. When a saw cut through a tree or log is completed, the load on the saw is suddenly removed and, if the operator has not closed the throttle, the engine instantly increases in speed.

The increase in engine speed proportionately increases the aspiration effective upon the main orifice 118 and the increase aspiration is effective on the valve 206 to open the valve by overcoming the pressure of spring 212 thereby admitting additional fuel through the passages 220, 218, 210, past the valve 206, through the counterbore 194, passage 192 and transverse passages 138 into the bore 126 in the fitting 124 thence into the mixing passage through the main orifice 118.

Through this method, the substantial increase in the amount of liquid fuel delivered into the mixing passage over-enrichens the mixture to an extent that the mixture of fuel and air then admitted into the crankcase of the engine is slow burning accompanied by incomplete combustion resulting in a substantial loss in power with a consequent automatic reduction in engine speed irrespective of the position of the throttle valve 36 in the mixing passage.

As the engine is reduced in speed, there is less aspiration or an increase in pressure in the mixing passage 12 transmitted to the valve 206 causes the valve 206 to close the fuel by-pass system and thereby restore a normal fuel and air mixture in the mixing passage for the engine so the engine will thereafter operate at a speed dependent upon the extent of opening position of the throttle valve 36 until the maximum speed, for which the spring 212 is calibrated, is exceeded.

Should the operator open the throttle valve 36 without placing a load on the engine, as by initiating a sawing operation, the engine upon exceeding a speed of approximately six thousand revolutions per minute will be automatically slowed down as the valve 206 will be opened by reason of the high aspiration in the mixing passage and automatically effect the delivery of excess fuel into the mixing passage through the by-pass system and the main orifice 118. In this manner an engine governing means is provided through control of engine speed by automatically varying the fuel and air ratio in the mixture to an extent that it is inadequate to operate the engine above a predetermined speed.

If it is desired to operate the chain saw up to a speed of seven thousand revolutions per minute for normal sawing operations, the spring 212 is proportioned or calibrated so that aspiration in the mixing passage up to an engine speed of approximately seven thousand revolutions per minute is insufficient to open the valve 206, but in the event that the engine exceeds this speed, the valve 206 is automatically opened and an over-enrichened mixture established to prevent excessive engine speed.

The rate of flow of the excess fuel to the mixing passage is metered by a restricted passage in the fuel by-pass system, and the particular position of the restriction is immaterial. In the by-pass system of FIGURE 5, the restriction may be the passage 192, the short passage 210 in the fitting 200, or the fuel channel 220 connecting the fuel chamber 42 with the annular chamber provided by the counterbore 198.

Through the provision of a restriction in the fuel by-pass system, the degree of over-enrichment of the mixture may be regulated and controlled.

It will be apparent from the foregoing description that the valved fuel by-pass arrangement has no effect whatever upon the normal functioning of the carburetor at engine idling and low speeds and in high speed operation up to a predetermined speed for which the spring 212 has been calibrated. The valved by-pass arrangement serves as an effective governing means actuated by aspiration to limit the engine speed which has no effect upon the normal operation of the carburetor at engine speeds within the aspiration or reduced pressure range for which the spring 212 is calibrated.

A modified arrangement of fuel by-pass for delivery of additional fuel into the mixing passage to prevent excessive engine speed is illustrated in FIGURE 7. In this form the main fuel delivery system is the same as that hereinbefore described in the form of the construction illustrated in FIGURES 1 through 6, and includes a fitting 124a in the body 10a providing a main orifice 118a. The fitting is provided with a ball check valve 132a to prevent back bleeding of air into the fuel channel system when the secondary orifices are delivering fuel into the mixing passage in the manner hereinbefore described.

Fuel is conveyed from the diaphragm fuel chamber 42a through the connecting passages 142a, 140a, past the needle valve 150a through passage 144a and into the fitting 124a for delivery through the main orifice 118a. The valve body 148a fashioned with the needle valve portion 150a is manually adjustable for metering fuel flow from chamber 142a to the orifice 118a. In the arrangement shown in FIGURE 7, the valved fuel by-pass arrangement is inclusive of a fitting 200a of the same construction shown in FIGURE 5 and hereinbefore described. The fitting 200a encloses a spring-biased ball valve 206a.

In this form, a fuel passage for the delivery of by-passed fuel into the mixing passage is independent of the fitting 124a and main orifice. A fuel channel 230 is drilled in the body 10 spaced from the fitting 124a, the lower end of the channel 230 being closed by a plug 232. The channel 192a establishes communication between the counterbore 194a and the independent auxiliary fuel delivery channel 230, as shown in FIGURE 7.

In this form, the fuel channel system of the fuel by-pass arrangement includes passage 220a, the annular chamber 198a surrounding the shank of the fitting 200a, transverse passages 218a, bore 210a, the hollow interior of fitting 200a, bore 194a, passage 192a and fuel delivery channel 230. The spring biasing the ball valve 206a toward closed position is calibrated so that the ball valve 206a will not be opened until the engine with which the carburetor is used exceeds a predetermined speed, as for example, six thousand revolutions per minute.

The carburetor operates at speeds up to six thousand revolutions per minute in a normal manner, at intermediate and high speeds the fuel being delivered by the primary system through the main orifice 118a into the mixing passage. When the engine exceeds the speed for which the spring, holding the ball valve 206a on its seat is calibrated, the increased aspiration caused by increased engine speed is effective through the by-pass fuel channels and passages above described to effect opening of the valve 206a whereby additional fuel is aspirated into the mixing passage through the channel 230.

The delivery of excess fuel into the mixing passage enrichens the fuel mixture to an extent providing a slow burning, low power mixture for the engine, causing the engine to be reduced in speed. Upon reduction in engine speed the aspiration decreases, the valve 206a is again closed under spring pressure, and fuel delivery resumed through the main orifice 118a or through the secondary orifice system hereinbefore described in connection with the form of the invention, shown in FIGURES 1 through 6, to reestablish normal operation of the engine.

FIGURE 8 is a view similar to FIGURE 7 illustrating a modified form of primary or main fuel delivery system in combination with an aspiration-controlled fuel by-pass system of the invention.

The main fuel delivery orifice construction is inclusive of a bore 240 formed in the body 10b, the end of the bore at the diaphragm fuel chamber 42b being closed by a cap or plug 242. The main fuel delivery orifice 244 is the outlet of a comparatively-short restricted passage 245 through which fuel is delivered from the well or bore 240 into the mixing passage.

The primary fuel delivery system for the main orifice includes a channel 142b arranged between the fuel chamber 42b and the bore 140b. A restricted passage 246 connects the bore 150b with the well 240. A needle valve 248 of the manually adjustable valve body 148b is fashioned with a comparatively long acute taper for cooperation with the restricted passage 246. Through the use of a long tapering needle portion 248 as the metering means for controlling fuel flow to the main orifice 244, the needle valve portion, in conjunction with the restricted passage 244, provides an annular region of small area through which fuel flow is established to the main orifice.

This annular area promotes the formation of an effective capillary seal or liquid block of the liquid fuel in the passage to prevent back bleeding of air through the main orifice 244 when the engine idling or low speed orifices viz. the secondary orifice system is delivering fuel into the mixing passage as hereinbefore described in reference to the form of the invention shown in FIGURES 1 through 6. The arrangement for promoting the formation of a capillary seal or liquid block in the main or primary fuel delivery system is similar to that disclosed in Patent No. 2,841,372.

The capillary seal formed at the annular region between the needle valve portion 248 and the inner wall of the restriction 246 is of sufficient strength to prevent back bleeding during engine idling but readily overcome by aspiration in the mixing passage when aspiration is effective to deliver fuel from the main orifice 244 into the mixing passage as the increase in aspiration fractures the liquid block or capillary seal to establish fuel flow from the chamber 42b through the main orifice 244.

As the passage 245 providing the main orifice 244 is of restricted size, a liquid block or capillary seal tends to form in passage 245. However, due to the close proximity of the surfaces defining the annular fuel passage between the needle valve portion 140b and the wall of the restricted passage 246, the capillary seal or liquid block formed at the latter region is stronger than the capillary seal established in the passage 245.

The fuel by-pass arrangement shown in FIGURE 8 is the same as that illustrated in FIGURE 7 with the exception that the passage 192b, in communication with the counterbore 194b is in direct communication with the well 240. The fuel by-pass system in the form shown in FIGURE 8 includes the fitting 200b having an interior bore in which is disposed the spring biased ball valve 206b, a short passage 210b in communication with transverse passages 218b establishing communication with the annular chamber 198b which is in communication with the fuel chamber 42b through the duct or channel 220b.

As the fuel by-pass system above-described is normally closed by the ball chack valve 206b, operation of the engine with which the carburetor may be used under idling and low speed conditions is not affected by the fuel by-pass system. The delivery of fuel through the main orifice 244 for intermediate and high speed operation of the engine is not affected by the fluid by-pass system until the engine exceeds a predetermined speed.

When the engine exceeds a predetermined speed, aspiration is increased, causing the valve 206b to be opened and an excess amount of fuel delivered through the fuel by-pass system into the well 240 thence through the passage 245 and main orifice 244 into the mixing passage to over-enrichen the fuel and air mixture as hereinbefore described.

When the engine is idling or operating at low speed by fuel delivered by the secondary orifice system, back bleeding of air into the fuel channels through the main orifice 244 is prevented by the capillary seal or liquid block formed in the restricted passage 246 around the needle valve 248. The formation of the capillary seal or liquid block does not affect idling or low speed operation as the fuel by-pass system is closed by the ball chack valve 206b.

FIGURE 9 illustrates a modified form of the arrangement shown in FIGURE 8. In FIGURE 9, the main fuel delivery system is the same as that shown in FIGURE 8 and includes the fuel channel 152c in communication with the diaphragm fuel chamber 42c, bore 140c, restricted passage 246c, well 240c, passage 245 and main orifice 244c.

The manually adjustable fuel metering needle valve 248c is of the same configuration as the needle valve 248 which with the restricted passage 246c forms a capillary seal or a liquid block to prevent back bleeding of air through the main orifice 244c when the secondary or idling and low speed system is in operation.

In the form of construction shown in FIGURE 9, the passage 192c of the fuel by-pass system is in communication with the bore 194c and in communication with an independent channel 250 drilled in the carburetor body 10c in substantial parallelism with the axis of the fuel passage 246c and the well 240c but spaced therefrom, the lower end of the channel 250 being closed by a plug 252. Thus, in this form of construction, excess fuel is delivered into the mixing passage through the independent channel 250 when the engine exceeds a predetermined speed. The other components of the fuel by-pass system in FIGURE 9 are identical with those shown and described in connection with the form shown in FIGURE 8.

FIGURE 10 illustrates the fuel by-pass arrangement of the invention associated with a primary or main fuel delivery system embodying another form of means providing a capillary seal or liquid fuel block to prevent back bleeding of air through the main orifice when the secondary orifice system is delivering fuel into the mixing passage. In this form the carburetor body 10d is fashioned with a main fuel delivery orifice 260, a fuel well 262 in communication with a bore 264 through a restricted passage 266, the bore 264 being in communication with the diaphragm fuel chamber 42d by a fuel passage 268.

A manually adjustable needle valve 270 extends into and cooperates with the restricted passage 266 for metering fuel flow to the main or primary orifice 260 for intermediate and high speed engine operation. The carburetor is fashioned with engine idling and low speed orifices forming a secondary orifice system as in the other forms of construction hereinbefore described. The lower end of the bore forming the well 262 is closed by means of a cap 272.

Arranged in the upper region of the well 262 is a member 274 of mesh formation, such as a metal screen, providing a plurality of interstices or small openings through which liquid fuel flows for delivery through the main orifice 260 in the mixing passage. The screen 274 is held in position by an annular or ring shaped member 276. The screen 274 is of comparatively fine mesh providing openings of a size such that the liquid fuel tends to be retained in the openings and provide a capillary seal or liquid block to prevent back bleeding of air through the main orifice 260 into the fuel channels when the secondary orifice system is delivering fuel into the mixing passage for engine idling or low speed purposes.

The fuel by-pass system for delivering excess fuel into the mixing passage is of the same character as shown in FIGURE 8, and includes a spring-biased ball valve construction in the body 10d, the passage on the interior of the fitting enclosing the ball valve being in communication with the bore 194d, the bore being in communication with the well 262 through the passage 192d.

The arrangement shown in FIGURE 10 for delivering fuel through the main orifice 260 for intermediate and high engine speeds is the same as that hereinbefore described in connection with the other forms of construction shown herein.

In the event that the engine, under no load conditions, exceeds a predetermined speed for which the spring in the valved by-pass arrangement is calibrated, the valve is opened by aspiration transmitted through the main orifice 260, well 262, passage 192d and counterbore 194d to influence the valve in the fuel by-pass system to be opened to admit excess fuel through passage 192d into the well 262 thence through the main orifice 260 to over-enrichen the mixture in the mixing passage to prevent excess engine speed.

Upon reduction in engine speed and closing of the fuel by-pass valve, normal operation of the engine at intermediate and high speeds is reestablished. When the engine idling orifice or low speed orifice of the secondary fuel delivery system is in operation the liquid fuel in the interstices or openings in the screen 274 form a capillary seal or liquid fuel block to prevent back bleeding of air through the main orifice 260 into the fuel channels in the carburetor.

FIGURE 11 illustrates a modified form of the arrangement shown in FIGURE 10. In the form shown in FIGURE 11, the main orifice 260e, well 262e, passage 266e, bore 264e and fuel channel 268e in the body 10e are the same as illustrated in FIGURE 10.

The metering of fuel to the main fuel orifice 260e is attained by manual adjustment of the needle valve 270e. The upper region of the well 262e is provided with a screen or mesh material 274e to promote the formation of a capillary seal or liquid fuel block for preventing back bleeding into the fuel channels during engine idling or low speed operation.

The carburetor body 10e is formed with a drilled passage or channel 280 which forms the delivery channel for the fuel by-pass system, the latter being of the same character as herein shown in FIGURE 8 and hereinbefore described. The counterbore 194e is in communication with a channel 280 through the passage 192e, the lower end of the channel 280 being closed by a plug 282. During high speed engine operation the arrangement shown in FIGURE 11 functions in the same manner as the arrangement shown in FIGURE 10. Under engine idling or low speed operation the screen 274e holds the fuel to provide a capillary seal or liquid fuel block to prevent back bleeding.

In the event that the engine exceeds a predetermined speed, the valve means in the fuel by-pass arrangement is opened by aspiration in the mixing passage transmitted through the fuel channel 280 to the valve causing the valve to open and admit excess fuel delivered through the channel 280 into the mixing passage to reduce engine speed.

FIGURE 12 illustrates another form of fuel by-pass and valve arrangement for delivering excess fuel into the mixing passage when the engine exceeds a predetermined speed. The carburetor body 10f has a primary fuel system of the character shown in FIGURE 5 and a secondary system (not shown) of the character illustrated in FIGURE 6. The primary system includes a fitting 124f providing the main fuel delivery orifice 118f, fuel for intermediate and high engine speeds being conveyed to the main orifice from the diaphragm fuel chamber 42f by duct 142f, bore 140f, passage 144f past the manually adjustable needle valve 150f and passages in the fitting 124f, the latter enclosing a ball check valve 132f for preventing back bleeding of air through the main orifice.

The fuel by-pass arrangement shown in FIGURE 12 includes a bore 300 in the body 10f having a restricted outlet passage 302 opening into the mixing passage. Disposed in the bore 300 is a ball valve 304 and an expansive coil spring 306. Pressed into a circular recess formed in the upper surface of the fuel chamber 42f is an annular member 308, the opening 310 in member 308 being normally closed by the spring biased valve member or check ball 304.

The biasing spring 306 is calibrated so that aspiration in the mixing passage, set up when the engine exceeds a predetermined speed, is effective to lift the ball valve 306 from its seat provided by the annular member 308 to admit additional fuel from the fuel chamber 42f through the port 310, bore 300 and restricted passage 302 into the mixing passage to over-enrichen the fuel and air mixture for engine governing purposes as hereinbefore explained.

In this form the metering restriction for the rate of flow of fuel through the by-pass may be the port 310 or the delivery passage 302.

It is to be understood that the fuel by-pass arrangement of FIGURE 12 may be used in conjunction with any of the main or primary fuel delivery systems illustrated in other figures of the drawings and hereinbefore described.

In all forms of the invention disclosed for performing the method of the invention, an engine with which the carburetor is used is controlled against excessive speed simply by controlling the air and fuel mixture supplied to the engine and the maximum high speed for the engine predetermined by calibrating the spring associated with the fuel by-pass valve.

It is apparent that, within the scope of the invention, modifications and different arrangements may be made other than as herein disclosed, and the present disclosure is illustrative merely, the invention comprehending all variations thereof.

I claim:

A method of controlling fuel and air mixture in a charge forming apparatus for an internal combustion engine wherein the charge forming apparatus has a throttle-controlled fuel and air mixing passage and a fuel chamber, controlling fuel flow from a supply into the fuel chamber by a diaphragm-operated fuel inlet valve wherein the diaphragm is responsive to differential pressures, creating by separate means in the charge forming apparatus a pressure drop proportional to increasing flow velocity in the fuel and air mixing passage, metering fuel flow by a restriction between the chamber and mixing passage, the differential in pressure created by the separate means being between the mixing passage and the fuel chamber and forms a full power mixture in the mixing passage by delivering fuel through an outlet at flow velocities within a predetermined range of engine speeds and at any throttle setting, and increasing the rate of fuel flow from the fuel chamber into the mixing passage in a disproportionate degree at full open throttle as differential pressures increase in the separate means creating said pressure drop when the engine exceeds said predetermined speed range to provide an overrich slow burning mixture for the engine to reduce the speed of the engine.

References Cited by the Examiner

UNITED STATES PATENTS 2,774,582   12/1956   Bracke _____ 261—41.4

MARK NEWMAN, *Primary Examiner.*

LAURENCE M. GOODRIDGE, *Examiner.*